United States Patent Office 3,106,956
Patented Oct. 15, 1963

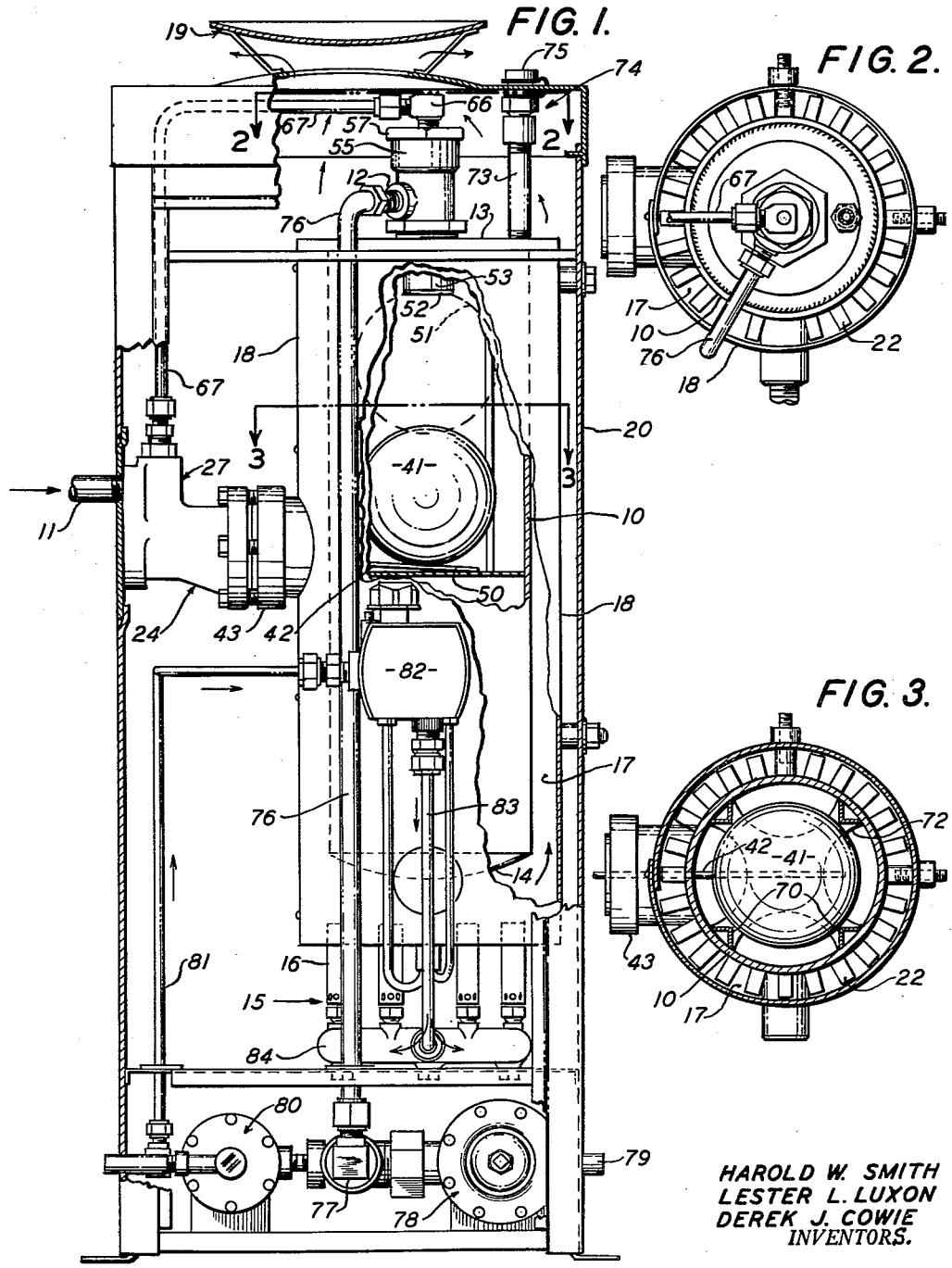

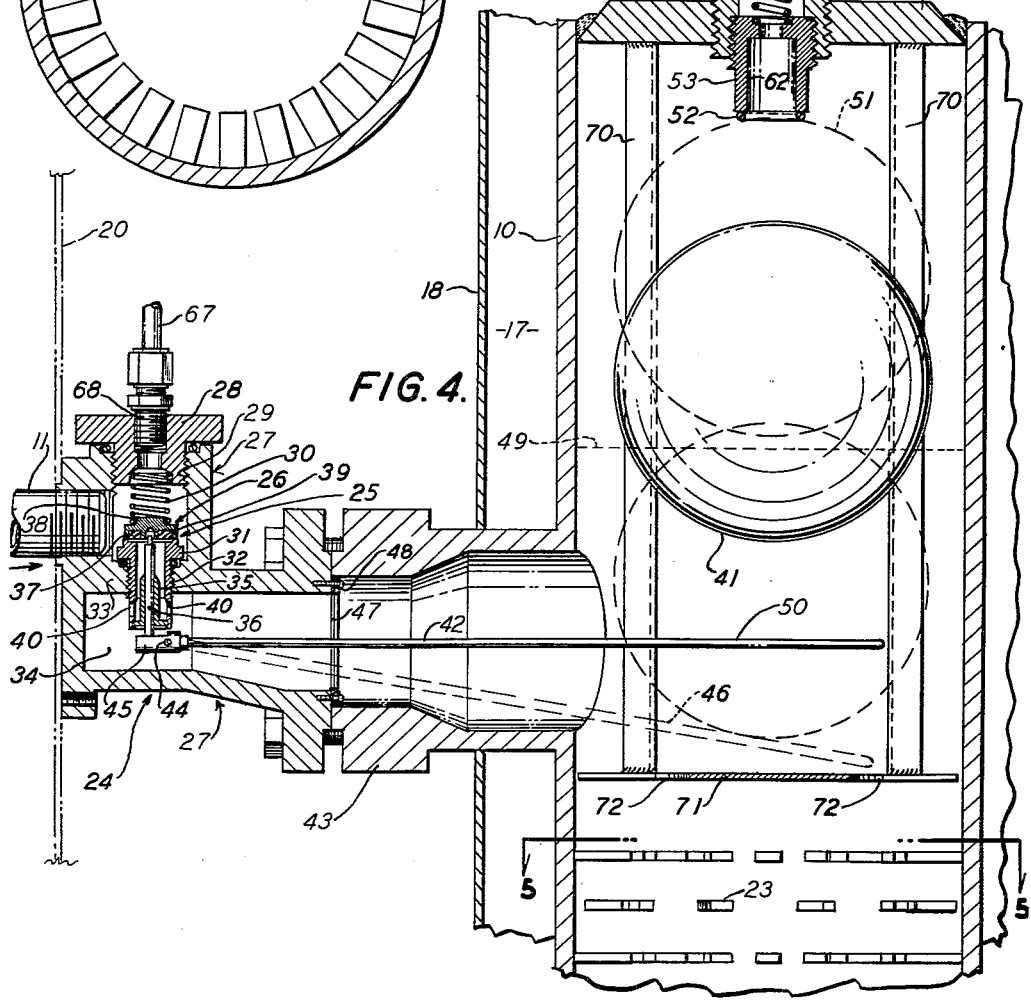

3,106,956
LIQUID FUEL VAPORIZER
Harold W. Smith, San Marino, Lester L. Luxon, Sierra Madre, and Derek J. Cowie, Los Angeles, Calif., assignors, by mesne assignments, to Algas Industries, a corporation of California
Filed July 18, 1961, Ser. No. 124,992
12 Claims. (Cl. No. 158—53)

This invention relates generally to vaporizers for liquid fuel such as liquid hydrocarbons, and more particularly concerns improvements in the control of vaporization promoting greater reliability, safety and simplicity of operation, as well as improvements in the rate of heat transfer to liquid being vaporized.

A major object of the invention concerns improvements in what may be generally characterized as inlet valve means functioning to control communication between a source of liquid fuel under high pressure, say up to 250 p.s.i., and a vaporizing chamber subject to heating to promote rapid vaporization of liquid fuel therein. In accordance with the concepts of the invention it is required that the inlet valve means function to pass sufficient liquid fuel into the chamber so as to maintain the liquid level therein within predetermined upper and lower limits, and also that the same inlet valve means function to allow backflow of fluid from the vaporization chamber in the event the pressure developed in the chamber exceeds a predetermined level. Such functioning of the inlet valve is brought about by the provision of inlet valve operator means including yieldable means such as a spring arranged to act in cooperation with the pressure of liquid fuel upstream of the inlet valve to seat the inlet valve and a float in the vaporization chamber for unseating the inlet valve as the surface level of liquid in the chamber drops. Also, the downstream side of the valve is made to communicate with the vaporizing chamber so that as pressure in the latter increases above the pressure in the supply line the inlet valve will unseat and allow vapor or liquid to leave the chamber of the level of liquid in the chamber.

Another important aspect of the invention concerns the provision of means for limiting the flow of vaporized fuel from the chamber to prevent undesirable overloading of the apparatus. This function is served by outlet valve means to control the flow of vapor from the chamber in such manner as to decrease vaporized fuel delivery as the vapor pressure in the chamber drops in relation to the liquid fuel pressure upstream of the inlet valve means. As will be brought out, an important safety feature is found in the provision of a seat for the float to close the vapor outlet from the chamber when the float is lifted against the seat in response to a predetermined rise of the liquid surface level in the vaporizing chamber.

Other important aspects of the invention which will be described in detail include the incorporation of a float actuated arm as a part of the inlet valve operator means, the arm and float being free of connection to one another so that the float may rise to close the outlet free of restraint imposed by the arm, and the construction of the vaporizing chamber in the form of a vertically elongated shell surrounded by a vertically elongated outer casing to provide a vertical passage for hot burner gases, the shell having metallic projections extending outwardly into the passage to absorb heat from the gases for greater heat transfer efficiency. Also, the shell may have inner projections extending into the liquid within the shell to promote heat transfer thereto.

These and other objects and advantages of the invention, as well as the details of an illustrative embodiment, will be more fully understood from the following detailed description of the drawings, in which:

FIG. 1 is a vertical elevation partly in section showing a preferred embodiment of the invention in a vaporizer for liquid fuel;
FIG. 2 is a section taken on line 2—2 of FIG. 1;
FIG. 3 is a section taken on line 3—3 of FIG. 1;
FIG. 4 is an enlarged fragmentary vertical section showing details of preferred embodiments of the inlet and outlet valve means for the vaporizer chamber; and
FIG. 5 is a section taken on line 5—5 of FIG. 4.

Referring to the drawings, the improved liquid fuel vaporizer comprises a vaporizing chamber typically as shown at 10, the chamber having a liquid fuel inlet 11 and a vaporized fuel outlet 12. Typically, the chamber 10 is metallic and vertically elongated with the inlet at one side of the chamber as shown and the outlet at the top of the chamber. Furthermore, the chamber is closed as by an upper plate 13 and a lower plate 14 so that liquid fuel admitted into the chamber is normally confined therein within the lower interior of the chamber for vaporization in response to heating of the shell and heat transfer to the liquid fuel.

Such heating may be effected as by the burner assembly generally indicated at 15 in FIG. 1, the hot gases from the burners 16 flowing upwardly through a vertically elongated annular passage 17 formed between the chamber 10 and a casing 18 which is also vertically elongated and cylindrical, the hot gases flowing upwardly around the chamber and leaving the passage 17 for ultimate discharge to the atmosphere through a top vent 19 in a vertically elongated outer shell 20 within which the chamber 10 and casing 18 are confined.

As shown in FIGS. 2 and 3, heat transfer from the passage 17 to the liquid within the lower interior 21 of the chamber 10 is promoted substantially by virtue of metallic studs 22 mounted on the chamber and projecting outwardly therefrom into the passage 17. These studs are spaced about the periphery of the chamber and therefore intercept the hot gases traveling upwardly through the passage 17 so as to receive heat therefrom and transfer the heat to the chamber 10. Although the studs are well illustrated in FIGS. 2 and 3, they are not shown in FIG. 1 in order to eliminate confusion.

Even greater promotion of heat transfer to the liquid fuel within the lower interior of the chamber may be by the provision of interior studs 23 projecting into the chamber from the wall thereof as shown in FIGS. 4 and 5. Thus, heat transferred from the outer studs to the chamber shell is in turn transferred to the inner studs 23 around which the liquid within the chamber circulates, in direct heat receiving contact with the studs 23.

Referring now to FIG. 4, the high pressure liquid fuel supply is admitted to the chamber 10 from the inlet 11 through an inlet assembly 24 which includes an inlet valve means 25 to control pressurized liquid fuel delivery to the chamber. In its preferred form, the inlet valve means includes a movable seat assembly 26 contained within a body 27 which comprises part of the inlet assembly 24. A plug 28 threaded into the bore 29 of the body 27 retains the upper end of a compression spring 30 the lower end of which urges the movable seat assembly 26 downwardly toward a tubular orifice member 31. The latter is in turn threaded at 32 into and through the wall 33 of the body 27 so as to project into the hollowness 34 of the body 27. Projecting upwardly through the tubular orifice member 31, and specifically through an interior guide 35 therein, is a stem 36 the upper terminal of which fits within a central recess 37 in the retainer 38 of the seat assembly 26. Accordingly, when the stem 36 is lifted, it lifts the retainer 38 and the annular gasket or seal 39 retained therein so as to raise the seal off the tubular orifice member 31, thereby allowing pressurized inlet fuel to flow through the inlet 11 and the upper bore of the body 27, and then downwardly through the orifice member 31 to discharge through the orifice openings 40 into the lower bore or hollowness 34 of the body 27. Conversely, when the stem 36 is lowered sufficiently, the spring 30 holds the seat assembly 26 downwardly against the upper terminal of the tubular member 31, thereby to close off fuel supply through the orifice member 31.

The spring 30 may be considered as a part of the inlet valve operator means, and it will be understood that the spring acts in cooperation with the pressure of liquid fuel upstream of the valve to hold the seat assembly 26 closed or seated downwardly against the orifice member 31. The operator means also includes a float 41 in the chamber 10 and a float actuated arm 42 projecting laterally beneath the float through the tubular flanged fitting 43 to the chamber 10 and into the lower bore 34 of the inlet body 27 to a point directly below the stem 36. A transverse pin 44 extending through the arm section 45 pivots the arm to move in a vertical plane between a lower position as generally indicated at 46 and an upper position as shown in solid lines in FIG. 4. A vertically slotted plate 47 retained against the face 48 of the inlet body 27 acts to guide the arm 42 in its vertical pivotal movement.

In operation, when the level 49 of liquid in the chamber 10 has dropped for any reason to a point such that the float 41 bears downwardly against the rightward portion 50 of the arm 42 thereby to pivot the latter and open the inlet valve, pressurized liquid fuel flows into the chamber 10 and raises the level of the liquid therein, which is constantly vaporized due to heating thereof. Accordingly, under normal circumstances, a condition of equilibrium is reached whereby the amount of liquid fuel entering the chamber over a given period of time equals the amount of vaporized fuel leaving the chamber through the outlet 12. When the rate of usage begins to exceed the capacity of the vaporizer, the float rises and liquid flow into the vaporizer is throttled. The liquid level in the vaporizer depends on the rate of usage of the fuel and the rate of heat transfer into the liquid. Therefore, as the burner turns on and off, and or the rate of usage increases and decreases, the liquid level will rise and fall seeking a position of balance depending upon the rate of heat transfer and the fuel consumption. Should the pressure within the chamber 10 rise above a predetermined level, as measured at the inlet valve, the pressure will lift the movable seat assembly 26 off the tubular orifice member 31 and against combined pressure exerted by the upstream supply liquid fuel and the spring 30 thereby to permit backflow of the excess pressure from the chamber 10.

It will be observed that while the float 41 may urge the arm portion 50 downwardly by exerting downward force thereagainst, the float and arm are not integral or otherwise connected. Therefore, the float may lift away from the arm as the level 49 of liquid in the chamber rises. Should the liquid level for any reason rise unduly within the chamber, the float will ultimately be lifted to the position shown in broken lines at 51 at which time it will, being spherical, seat against the annular seal 52 at the lower terminal end of a tubular plug 53 which forms part of the outlet assembly 54. Accordingly, the liquid within the chamber will be prevented from discharging through the chamber outlet 12.

Referring to the details of the outlet assembly, it will be seen to include a tubular valve body 55 having a bore 56 into the lower end of which the plug 53 is threaded, and into the upper end of which a plug 57 is threaded. Received between the two plugs and within the bore is a pressure responsive valving member typically in the form of a tubular piston 58 the upper end of which is closed at 59 and the lower end of which is open. When the piston is in upper position as shown, a side port 60 extending through the tubular wall of the piston member is in full registration with the outlet bore 61 of the body 55 whereupon vaporized fuel from within the chamber 10 may discharge upwardly through the bore 62 of the plug 53 and through the piston bore 63 and the port 60 in registration with the outlet bore 61. A compression spring 64 is retained between the plug 53 and the closed upper end of the piston member 58 so as to urge the piston toward open position. In addition, the pressure of the vaporized fuel exerted against the piston surface 65 urges the piston toward open position.

The plug 57 receives a fitting 66 which normally communicates through a duct 67 with a fitting 68 received in the plug 28 of the inlet assembly 24. Accordingly, the full pressure of the liquid fuel supply is communicated through the fittings 68 and 66 and the duct 67 to the upper surface 69 of the piston member 58 for urging the piston member downwardly toward closed position, the latter being arrived at when the side port 60 in the piston member is fully out of registration with the outlet bore 61. Therefore, it will be understood that the outlet valve means operates to decrease the vaporized fuel delivery from the chamber 10 as the vapor pressure within the chamber falls in relation to the liquid fuel pressure upstream of the inlet valve means 25, downward movement of the piston member 58 serving to decrease the vaporized fuel delivery as described. This condition of decreased vaporized fuel delivery is desirable when for any reason the demand of vaporized fuel temporarily exceeds the supply capacity of the unit, and serves as a safety feature which prevents overloading of the unit.

Referring again to the vertical movement of the float 41 within the chamber 10 it will be observed that the float is retained between the vertical guides 70 which are attached to the upper plate 13 and depend therefrom to support a lower plate 71 above which the arm 42 and float are confined. The openings 72 through the lower plate 71 accommodate vertical circulation of fuel within the chamber 10 and above and below the lower plate 71. The upper plate furthermore supports the tubular stem 73 of a relief valve generally indicated at 74 in FIG. 1, the cap 75 of the valve projecting above the top of the outer shell 20 for release of vapor, the pressure of which has inadvertently built up to predetermined levels.

As seen in FIG. 1, vaporized fuel discharging through the outlet 12 is led back downward through a duct 76 to a T-fitting 77 from which the vapor may flow in one direction through a suitable regulator 78 and then to the vapor out connection 79, and also in the other or opposite direction through a fuel pressure regulator 80. From the latter the vapor flows through a duct 81 to the standard control 82 and then downwardly through a duct 83 to the fuel burner manifold 84 for ultimate delivery to the burners 16, the function of which has been described.

From the foregoing it will be understood that the improved vaporized unit will provide a steady, uniform gas supply, is safe, dependable and of high efficiency, and includes other advantages, which will be clear to those skilled in the art from the foregoing description and from the drawings.

We claim:

1. An improved liquid fuel vaporizer, comprising a vaporizing chamber having an inlet and a vaporized fuel outlet, inlet valve means to control pressurized liquid fuel delivery to said chamber, inlet valve operator means including yieldable means for acting in cooperation with the pressure of liquid fuel upstream of said valve to seat the inlet valve and a float in said chamber for unseating the inlet valve as the surface level of liquid in said chamber drops, the downstream side of said valve communicating with said chamber so that pressure therein increased above a predetermined value will unseat the inlet valve, the float having a range of positions characterized in that seating and unseating of the inlet valve remains substantially unaffected by the float position.

2. An improved liquid fuel vaporizer, comprising a vaporizing chamber having an inlet and a vaporized fuel outlet, inlet valve means to control pressurized liquid fuel delivery to said chamber, means including a gas burner for heating said chamber thereby to vaporize liquid fuel therein, inlet valve operator means including yieldable means for acting in cooperation with the pressure of liquid fuel upstream of said valve to seat the inlet valve and a float in said chamber for unseating the inlet valve as the surface level of liquid in said chamber drops, the downstream side of said valve communicating with said chamber so that pressure therein increased above a predetermined value will unseat the inlet valve, the float having a range of positions in which it is free of operative connection to the inlet valve.

3. An improved liquid fuel vaporizer, comprising a vaporizing chamber having an inlet and a vaporized fuel outlet, inlet valve means to control pressurized liquid fuel delivery to said chamber, inlet valve operator means including yieldable means for acting in cooperation with the pressure of liquid fuel upstream of said valve to seat the inlet valve and a float in said chamber for unseating the inlet valve as the surface level of liquid in said chamber drops, the downstream side of said valve communicating with said chamber so that pressure therein increased above a predetermined value will unseat the inlet valve irrespective of the level of liquid in said chamber, and outlet valve means for decreasing vaporized fuel delivery from said chamber as the vapor pressure in said chamber falls in relation to the liquid fuel pressure upstream of said inlet valve means.

4. An improved liquid fuel vaporizer, comprising a vaporizing chamber having an inlet and a vaporized fuel outlet, inlet valve means to control pressurized liquid fuel delivery to said chamber, inlet valve operator means including yieldable means for acting in cooperation with the pressure of liquid fuel upstream of said valve to seat the inlet valve and a float in said chamber for unseating the inlet valve as the surface level of liquid in said chamber drops, said outlet having a seat for the float to close the outlet when the float is lifted against the seat in response to a predetermined rise of the liquid surface level in said chamber, the downstream side of said inlet valve communicating with said chamber so that pressure therein increased above a predetermined value will unseat the inlet valve, the float having a range of positions in which it is free of operative connection to the inlet valve.

5. An improved liquid fuel vaporizer, comprising a vertically elongated metallic vaporizing chamber having a side inlet and an outlet near the top of the chamber, inlet valve means to control pressurized liquid fuel delivery to said chamber, a gas burner to receive vaporized fuel from said outlet for heating said chamber thereby to vaporize liquid fuel therein, inlet valve operator means including a spring for acting in cooperation with the pressure of liquid fuel upstream of said valve to seat the inlet valve, a float in said chamber and a float actuated arm for unseating the inlet valve as the surface level of liquid in said chamber drops, the downstream side of said valve communicating with said chamber so that pressure therein increased above a predetermined value will unseat the inlet valve irrespective of the level of liquid in said chamber, and outlet valve means for decreasing vaporized fuel delivery from said chamber as the vapor pressure in said chamber falls in relation to the liquid fuel pressure upstream of said inlet valve means.

6. The invention as defined in claim 5 in which said outlet valve means includes a valve body having a bore with entrance and discharge ports, a pressure responsive valving member movable in said bore between open and closed positions to control fuel flow through said ports, said member having pressure receiving surfaces respectively to receive application of the oppositely acting pressures of vaporized fuel within said chamber and of liquid fuel upstream of the inlet valve, and yieldable means for urging said member toward open position and against said liquid fuel pressure.

7. The invention as defined in claim 5 including float guide means in said chamber for guiding the float to move vertically, said outlet having a seat facing downwardly toward the float so that the float will close the outlet when lifted against the seat in response to a predetermined rise of the liquid surface level in said chamber.

8. The invention as defined in claim 7 in which the float actuated arm is pivoted to swing in a vertical plane, but the float and float actuated arm are free of connection to one another so that the float may rise to close said outlet free of restraint imposed by the arm.

9. The invention as defined in claim 5 in which said chamber comprises a vertically elongated shell directly above said burner means, and including metallic projections extending outwardly from the shell and a casing surrounding the shell and forming a vertical passage for confining hot burner gases to flow upwardly in direct heat transfer relation with said projections and the shell.

10. The invention as defined in claim 9 including metallic projections extending inwardly from the shell for promoting heat transfer to liquid therein.

11. The invention as defined in claim 3 in which said outlet valve means includes ducting communicating with the upstream side of said inlet valve means to which liquid fuel pressure is supplied.

12. The invention as defined in claim 6 in which said outlet valve means includes ducting communicating with one of said pressure receiving surfaces and with the upstream side of said inlet valve means to which liquid fuel pressure is supplied.

References Cited in the file of this patent
UNITED STATES PATENTS 2,493,369    Smith et al.    Jan. 3, 1950
2,551,501    Mitchell et al.    May 1, 1951